(12) United States Patent
Hatalkar

(10) Patent No.: US 7,325,049 B2
(45) Date of Patent: Jan. 29, 2008

(54) ALERT MANAGEMENT MESSAGING

(75) Inventor: Atul N. Hatalkar, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 1037 days.

(21) Appl. No.: 09/751,835

(22) Filed: Dec. 29, 2000

(65) Prior Publication Data

US 2002/0124068 A1    Sep. 5, 2002

(51) Int. Cl.
*G06F 15/173* (2006.01)
(52) U.S. Cl. .......................... 709/223; 700/4; 709/245
(58) Field of Classification Search ........ 370/470–471, 370/316, 310; 725/32–33; 709/219, 203, 709/236, 223–225; 700/4; 380/271; 358/1.14
See application file for complete search history.

(56) References Cited

U.S. PATENT DOCUMENTS

| 5,594,658 | A | * | 1/1997 | Lemaire et al. ............. 709/245 |
| 5,768,119 | A | * | 6/1998 | Havekost et al. ............. 700/4 |
| 5,909,651 | A | * | 6/1999 | Chander et al. ........... 455/466 |
| 6,021,433 | A | * | 2/2000 | Payne et al. ................ 709/219 |
| 6,084,969 | A | * | 7/2000 | Wright et al. ............... 380/271 |
| 6,226,098 | B1 | * | 5/2001 | Kulakowski et al. ...... 358/1.14 |
| 6,985,452 | B2 | * | 1/2006 | Marshall et al. ........... 370/310 |
| 6,992,991 | B2 | * | 1/2006 | Duske et al. ............... 370/316 |
| 7,035,914 | B1 | * | 4/2006 | Payne et al. ................ 709/219 |

\* cited by examiner

*Primary Examiner*—Thong Vu
(74) *Attorney, Agent, or Firm*—Fish & Richardson P.C.

(57) ABSTRACT

Techniques are described for providing alert management messages in a broadcast environment to individual recipients or to identifiable groups of recipients.

6 Claims, 4 Drawing Sheets

ALERT MANAGEMENT MESSAGING

BACKGROUND

This invention relates to network communications. Many network implementations employ end-to-end management, in which a "head end" device supplies information to one or more recipients, usually called "clients." Typically, the head end device is a computer, which acts as a server to one or more client devices, which also may be computers. In a typical broadcast network, communication between the head end and the clients is one-way, with the head end broadcasting the same information to all clients on the network.

In some circumstances, a client can open a point-to-point interactive channel with the head end, or the head end can open a point-to-point interactive channel with a client. The interactive communication may include alert management messages from the head end to the client, which generally represent the head end's response to an alert from the client or which may be a proactive action by the head end. An alert is a communication on an interactive channel opened by the client when the client detects a noteworthy condition and needs to inform the head end of the condition. An alert may be generated, for example, when a software or data download from the head end to a client fails a cyclical redundancy check (CRC). The head end typically reacts to an alert by performing the necessary operations and/or by sending an appropriate alert management message to the client on the interactive channel. In some cases, the interactive channel opened by the client closes before an alert management message can be sent, and the head end calls for a new interactive channel to relay the alert management message.

In some circumstances, the head end cannot open an interactive channel with a client. The head end may be physically unable to open an interactive channel, or the head end may be stopped from opening an interactive channel because of concerns related to cost, efficiency, or availability of resources. The client may be able to open an interactive channel with the head end, but the head end cannot compel the client to open the channel. When the head end lacks control to initiate an interactive channel with a client, the head end may not be able to pass alert management messages to the client by way of an interactive channel.

DETAILED DESCRIPTION

When the head end lacks control to initiate an interactive channel with a client, the head end may be unable to pass alert management messages to the client on an interactive channel. The alert management messages may be passed to clients, however, using system management messaging (SMM) capabilities of the broadcast channel.

Figure 1:
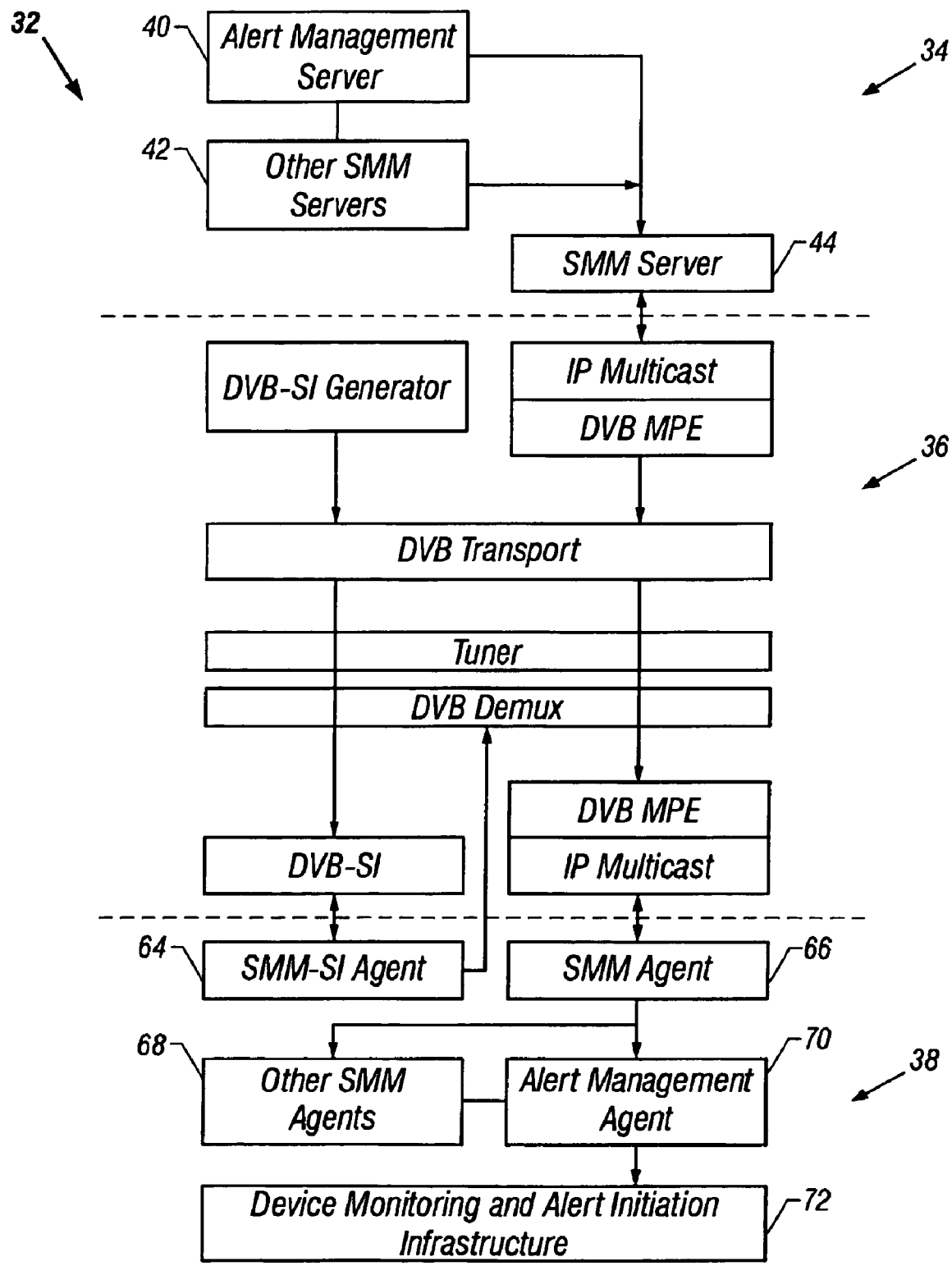
FIG. 1 is a diagram illustrating alerts and alert management employing system management messaging techniques.

FIG. 1 is a block diagram showing communication system 32 that uses SMM. The head end side of system 32 is identified by numeral 34, and the client side of system 32 is identified by numeral 38. Head end side 34 and client side 38 communicate via network 36. Network 36 includes protocol stacks to support digital video broadcasting (DVB). DVB is used in FIG. 1 as an exemplary protocol standard, but the techniques described herein are not limited to DVB. Although FIG. 1 shows a single client in communication with the head end, system 32 may be used to link head end side 34 to multiple clients.

On head end side 34, SMM Server 44 transmits system management messages to client side 38. A system management message may include an alert management message prompted by alert management server 40, which handles alerts. Techniques for using SMM to pass along alert management messages will be described in more detail below. System management messages may also be prompted by other servers 42. System management messages may be transmitted over network 36.

On client side 38, SMM agent 66 receives system management messages transmitted over network 36. In general, an "agent" is a part of client side 38 that automatically prepares and exchanges information or executes a task on behalf of the client. SMM agent 66 implements the SMM protocol described below. SMM agent 66 may, for example, recover the message. When the message pertains to alerts, SMM agent 66 may relay appropriate information to client's alert management agent 70, which, along with alert infrastructure 72, handles alerts. Information may be passed along to other agents 68 in client as well. Feedback may be provided to network 36 by a system information (SI) agent 64.

System management messages may be transmitted using a format. The message may begin with a field that holds information concerning the protocol of the message. As message protocols develop, the protocols may be designated as different versions, usually with later versions being assigned higher numbers than earlier versions. Clients may test this field, which may be designated "protocol_version," to ascertain the version of protocol of the message. A typical protocol message may be eight bits long in uimsbf (unsigned integer, most significant bit first) format, which would support 256 protocol versions.

The message may also include a field indicating whether the intended recipient is a single client, or a group of clients. This field, which may be designated "target_type" and may consist of a single bit in bslbf (bit string, leftmost bit first) format, may serve as a Boolean flag. When target_type=1, for example, the recipient is a group, and when target_type=0, the recipient is a single client.

The message may also include a field, designated "target," that identifies the client or group of clients from which the message is intended. This field may be sixty-three bits long in uimsbf format, offering considerable flexibility in identifying clients or groups of clients.

The message itself may include several fields. A field designated "message_id" may be used to identify each new message. Whenever the head end creates a new message for broadcast to clients, a unique identifying number may be assigned to this field. The message_id field may be thirty-two bits long in uimsbf format. In some circumstances, the head end may broadcast the same message several times. A message may be rebroadcast so that clients receiving the broadcast at a later time may receive it, for example, or a message may be rebroadcast for the benefit of clients using different protocol versions. In circumstances like these, all instances of the message may be assigned same message_id value. Clients receiving an incoming message can test the message_id field to detect whether the message is a new message or a duplicate of a previously received message.

The message may also include a "message_type" field, which may be, for example, sixteen bits long in uimsbf format. The value of the message_type field may indicate the general purpose of the message. For example, when the value of message_type is 0×01 (hexadecimal), the message is a test message; or when the value of message_type is 0×02, the message concerns software download scheduling information; or when the value of message_type is 0×03, the message concerns alert management. When SMM agent 66 tests the message_type field and finds a value of 0×03, SMM agent 66 may relay the message to client's alert management agent 70.

The message may contain a payload, that is, a message directed to a particular message type or a particular matter. A payload may also include a header, that is, data such as addressing or control information, at the beginning of the packet. The payload may be different for different kinds of system management messages.

When the system management message is an alert management message, the payload may be formatted to provide alert management information. The payload may, for example, consist of two bytes. The first eight bits may define an alert_type parameter, which identifies the type of alert addressed by the alert management message or the general purpose of the message. For example, alert_type 0×01 may denote an "Out of hard disk space" alert, and alert_type=0×02 may denote an "Application CRC failure" alert. Other values assigned to alert_type may denote other alert message types. The next bit of the payload may represent a new_status parameter, which is a Boolean flag. The new_status flag may specify a status or state for the type of alert. The meaning of the new_status flag may depend upon the alert_type value. For example, if the alert_type value indicates an application CRC failure, the new_status parameter may pertain to initiation of alert messages, with new_status=1 meaning enable client initiation of alert messages, and new_status=0 meaning disable client initiation of alert messages. The remaining seven bits of the payload may be used to provide other information, or may be reserved for future use. The payload applicable to alert management messages may be of a size other than two bytes.

To allow for flexibility in sending payloads, the field payload_size may be used to identify the number of bytes in the payload. The payload_size field may be 16 bits in uimsbf format. The bytes that make up the payload may be transmitted in several payload_byte fields. Because the client can test the payload_size field, the client can determine how many payload_byte fields need to be read. A payload_byte field may be a byte in bslbf format.

The fields of an SMM message, with the size and format of each field, are shown in Table 1. The field sizes and formats are for purposes of illustration, and the techniques described herein are not limited to particular sizes or formats. Moreover, an SMM message may include more fields or fewer fields, and may include fields in a different order than is shown in Table 1.

TABLE 1

| FIELD | BITS | FORMAT |
| --- | --- | --- |
| protocol_version | 8 | uimsbf |
| target_type | 1 | bslbf |
| target | 63 | uimsbf |
| message_id | 32 | uimsbf |

TABLE 1-continued

| FIELD | BITS | FORMAT |
| --- | --- | --- |
| message_type | 16 | uimsbf |
| payload_size | 16 | uimsbf |
| payload_byte(s) | 8/byte | bslbf |

Figure 2:
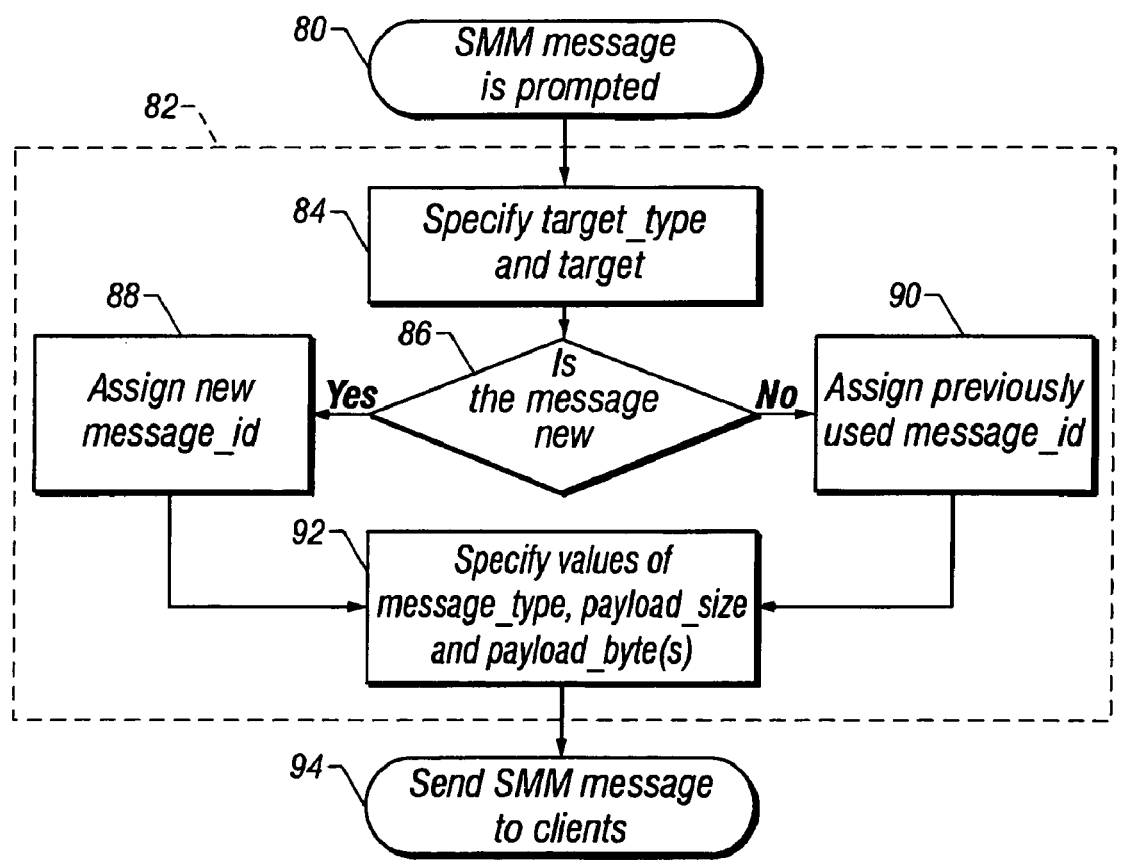
FIG. 2 is a flowchart illustrating methods for preparing and broadcasting an alert management message using system management messaging.

FIG. 2 is a flowchart showing methods employed by head end 34 in preparing and broadcasting an alert management message. An alert management message is prompted by alert management server 40 (80). SMM server 44 prepares the SMM message by assigning values to the message fields shown in Table 1 (82). SMM server 44 specifies the value of message_type to indicate that the message is an alert management message, and SMM server 44 further specifies payload_size and payload_byte(s) (92). In particular, SMM server 44 specifies the alert_type parameter and the new_status parameter. In the case of an "Application CRC failure," or example, alert_type may be set to 0×02, and new_status parameter may be set to 0 to disable client initiation of alert messages.

Preparation of the SMM message may involve other steps not shown in FIG. 2, such as assigning a value to the protocol_version field, error checking, record keeping, or preparation of a header. Typically, the alert management message is sent as a stream of data in internet protocol (IP) packets to all clients in the network (94). The techniques described herein may be used with protocols other than IP, however.

Figure 3:
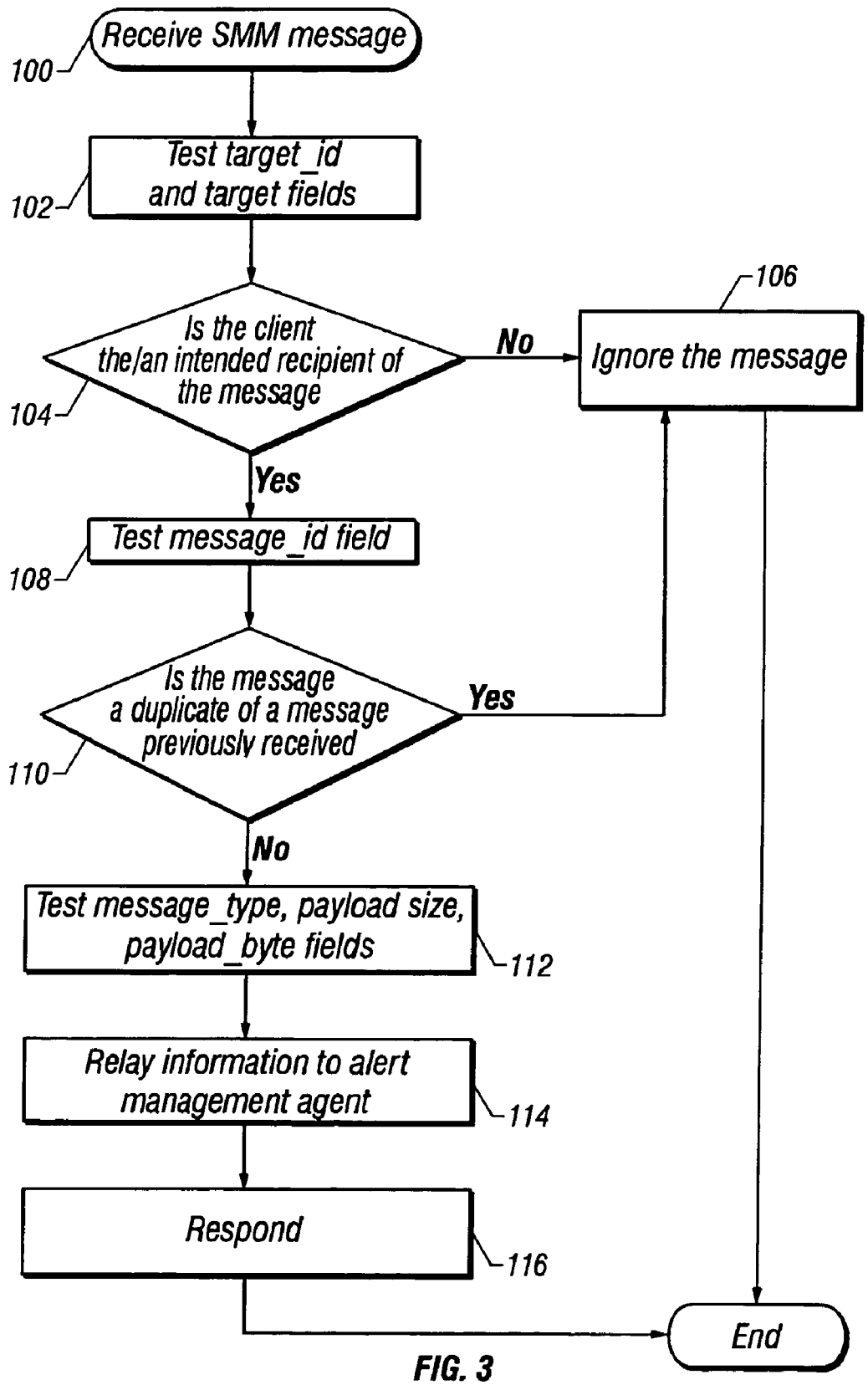
FIG. 3 is a flowchart showing methods for receiving and recovering an alert management message using system management messaging.

FIG. 3 is a flowchart showing methods employed by a client receiving an alert management message. After receiving the SMM message (100), the SMM agent 66 tests the target_type and target fields (102). If SMM agent 66 finds that the message is targeted for a single recipient other than the client, or if SMM agent 66 finds that the message is targeted for a group of which the client is not a member (104), SMM agent 66 ignores the message (106). If the client is an intended recipient, SMM agent 66 tests the message_id field (110). SMM agent 66 may compare the message_id field to message_id fields previously received (110). If the message is a duplicate of a message already received, SMM agent 66 may ignore the message (106). If the message is not a duplicate, SMM agent 66 recovers the message by testing the message_type field, the payload_size field and the payload_byte fields (112). When the SMM message is an alert management message, SMM agent 66 may relay the message to alert management agent 70 for handling (114). Alert management agent 70 may respond (116) to the message. A response may include, for example, performing a requested action, such as initiating an interactive channel or disabling initiation of alert messages, or assuming a requested alert management state, such as a disabled-alert state. In some instances, no response may be required.

Figure 4:
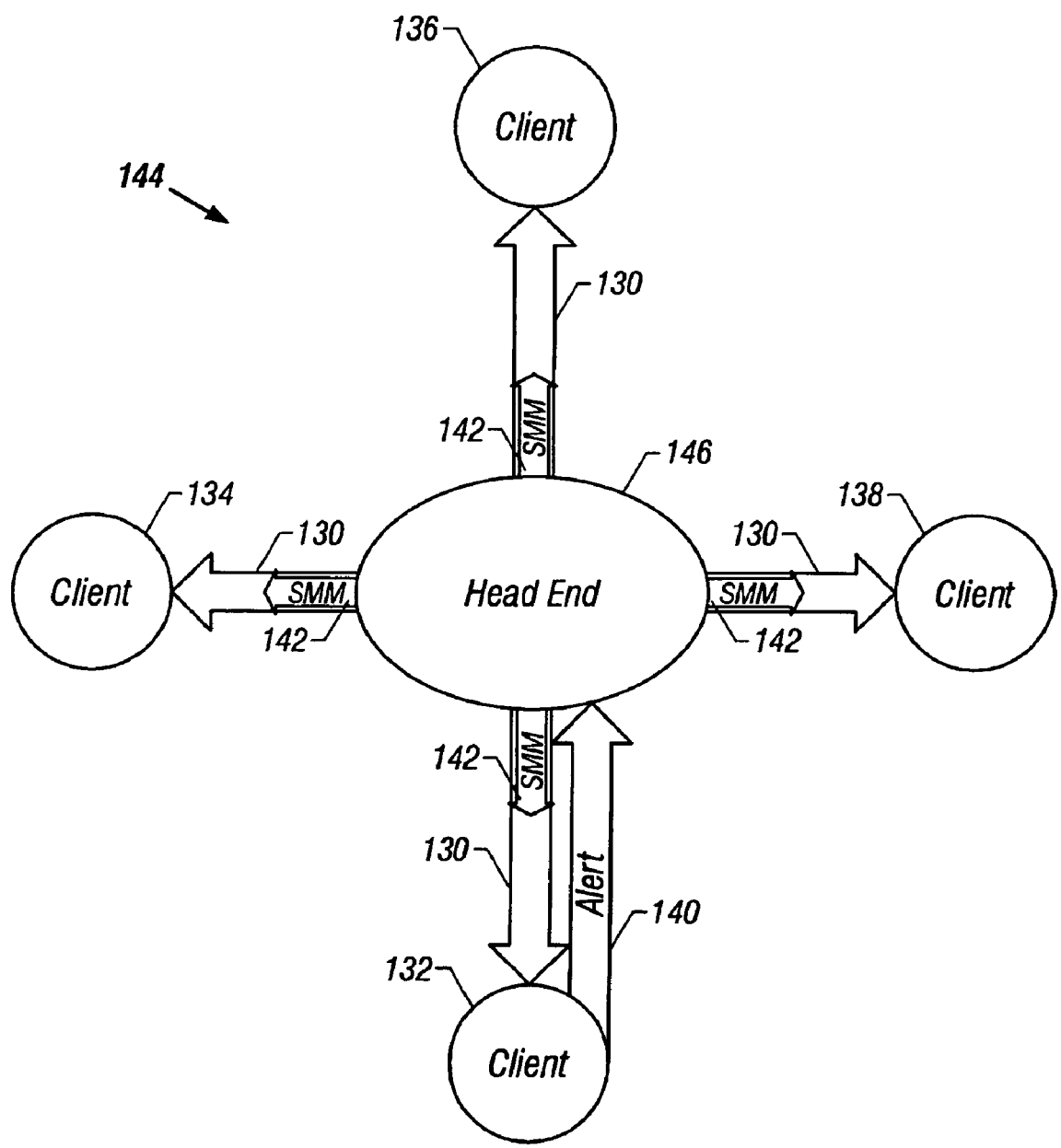
FIG. 4 is a diagram illustrating a use of alert management messaging.

FIG. 4 illustrates an exemplary situation involving alerts and alert management, employing the techniques described above. Head end 146 engages in one-way communication 130 with clients 132, 134 and 136 as part of a satellite-based network (client 138 signs on to the network later). Clients 132, 134, 136 and 138 may be four of thousands of clients receiving the broadcast from head end 146. In the course of the broadcast communication, head end 146 downloads data to clients 132, 134 and 136. For some of the clients, the CRC of the data fails. Clients may react to the CRC failure in different ways. Client 132, for example, initiates interactive communication in the form of an alert 140. Client 132 may be one of many clients that send alert messages to head end 146. Client 134, for example, attempts to initiate an alert but fails. Head end 146 may be deluged with alerts from the clients, preventing clients such as client 134 from initiating interactive channels. Not only may the inrush of alerts may tax the interactive capability of head end 146, the inrush may cause head end 146 to execute its software more slowly. Client 136, in an example of another reaction to the CRC failure, does not attempt to initiate an alert at all.

Head end 146 learns of the problem from alert 140 from client 132, or because head end 146 is apprised of the problem in other ways. In this situation, it may be desirable for head end 146 to contact all of the clients, not just those that have successfully opened interactive channels, to instruct the clients not to generate more alerts, thereby alleviating a deluge of alerts.

Head end 146 broadcasts an alert management message as SMM message 142 to all clients in the network. SMM message 142 (in addition to including other information) may specify in the target_type field that the target is a group of clients, and may specify in the target field the clients included in the group. The target group may be a subset of the full group of clients. All connected clients, including clients 132, 134 and 136, receive SMM message 142. Client 138, not yet receiving communication from head end 146, does not receive the message. Target clients that receive the message may recover the message. The message may, for example, direct the target clients to disable client initiation of alert messages. SMM message 142 may be repeated for the benefit of clients that connect at a later time, such as client 138. Each repetition of the message includes the same value in the message_id field, so clients 132, 134 and 136, who have already received the message, can ignore the message after testing the message_id field. When head end 146 has resolved the problems, head end can issue another alert management message as an SMM message to direct the target clients to enable client initiation of alert messages.

A number of embodiments of the invention have been described. These and other embodiments are within the scope of the following claims.

The invention claimed is:

1. A method of sending an alert management message from a head end to a plurality of recipients on a broadcast channel comprising:

receiving an alert which can be one of a plurality of different types from one of the plurality of recipients;

generating a first data field of the alert management message that identifies at least one target recipient from among the plurality of recipients, the at least one target recipient including the one of the plurality of recipients;

generating a second data field of the alert management message that identifies the type of alert management message, wherein the type of alert management message is based on the type of alert;

generating a third data field of the alert management message that uniquely identifies the alert management message; and transmitting the alert management message to the plurality of recipients.

2. The method of claim 1 wherein the third data field is used by the plurality of recipients to determine whether the alert management message is a new message.

3. The method of claim 1, the alert management message including a payload message, the method further comprising:

generating the payload message, the payload message comprised of at least one byte;

transmitting the number of bytes in the payload message; and transmitting the payload message.

4. An article comprising a computer-readable medium that stores computer-executable instructions for sending an alert management message from a head end to a plurality of recipients, the instructions causing a machine to:

receive an alert from one of the plurality of recipients, which alert can be one of a plurality of different types;

generate a first data field of the alert management message that identifies at least one target recipient from among the plurality of recipients, the at least one target recipient including the one of the plurality of recipients;

generate a second data field of the alert management message that identifies the type of alert management message based on the type of the alert;

generating a third data field of the alert management message that uniquely identifies the alert management message; and transmit the alert management message to the plurality of recipients.

5. The article of claim 4, wherein the third data field is used by the plurality of recipients to determine whether the alert management message is a new message.

6. The article of claim 4, the alert management message including a payload message, instructions further causing the machine to:

generate the payload message, the payload message comprised of at least one byte;

transmit the number of bytes in the payload message; and transmit the payload message.

* * * * *